Figure 1:
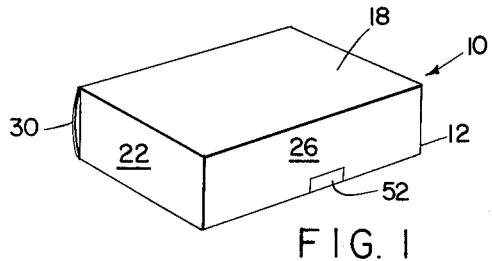

Oct. 27, 1964    R. SWEENEY    3,154,052
DISPOSABLE SANITARY STATION FOR PET ANIMALS
Filed July 17, 1962    2 Sheets-Sheet 1

INVENTOR.
ROBERT SWEENEY
BY Morso & Altman
ATTORNEYS

Oct. 27, 1964  R. SWEENEY  3,154,052
DISPOSABLE SANITARY STATION FOR PET ANIMALS
Filed July 17, 1962  2 Sheets-Sheet 2

INVENTOR.
ROBERT SWEENEY
BY
Morse & Altman
ATTORNEYS 3,154,052
**DISPOSABLE SANITARY STATION FOR
PET ANIMALS**
Robert Sweeney, Medford, Mass., assignor to Sweeney's
Enterprises, Inc., Medford, Mass., a corporation of
Massachusetts
Filed July 17, 1962, Ser. No. 210,467
1 Claim. (Cl. 119—1)

This invention relates generally to animal commodes and more particularly concerns a novel, self-packaging and completely disposable sanitary station for use with small house pets such as cats, puppies and the like.

One of the most objectionable aspects of keeping a house pet such as a cat or dog is the maintaining of suitable toilet facilities, particularly in relatively crowded quarters such as an apartment or hotel room. Where the animal is trained to use an indoor toilet station exclusively there is the unpleasant task of keeping the station clean to prevent the development of offensive odors or other unhealthy conditions.

In practice, heretofore, pet owners have frequently used as a toilet station, old newspapers or a quantity of sand or ground clay in a shallow tray. Newspapers are particularly inefficient since they have very little absorbency and must be discarded almost immediately after use. Sand or ground clay have more permanence in that they are highly absorbent materials and provide an area of earthy material suitable for pawing to which animals, particularly cats, are by nature attracted. However, even the sand or clay must be regularly cleaned, by screening, for example, and periodically discarded for replacement by a fresh change. This is sometimes accompanied by some of the contents of the tray being accidentally spilled while the sand is being transferred from the tray to a disposable receiver. The tray which is used to contain the sand usually must be cleaned by washing at regular intervals as a natural sanitation precaution. In any event, existing measures for keeping some sort of a pet toilet station are inefficient and, at best, result in a messy and unpleasant routine.

Accordingly, it is an object of the present invention to provide improvements in toilet stations for house pets and the like.

Another object of this invention is to provide a self-packaging pet sanitary station.

Still another object of this invention is to provide a pet toilet station which may be conveniently stored or carried, is easily set up and yet is neatly and completely disposable.

More particularly, this invention features a self-packaging pet toilet station comprising a carton of relatively stiff, moisture-resistant material and constructed to fold from a fully closed box, containing a charge of granular absorbent material, into an expanded open tray in which the granular material may be spread over the tray bottom. The box preferably is a one-piece affair formed with mating bottom and cover portions hinged to one another by a unique joint which permits a free and easy opening and closing action as well as converting into portions of the upright side walls which define the open tray.

But these and other features of the invention, along with further objects and advantages thereof, will become more fully apparent from the following detailed description of the invention, with reference being made to the accompanying drawings in which:

FIG. 1 is a view in perspective of a preferred embodiment of the invention and showing the self-packaging station in a fully closed condition.

Figure 2:
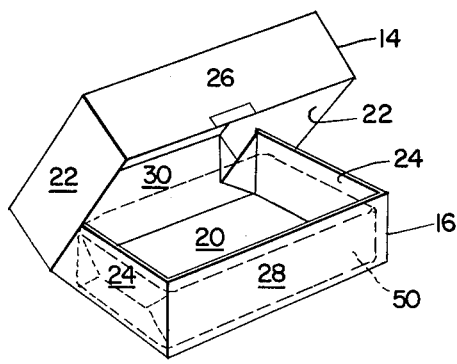
Figure 3:
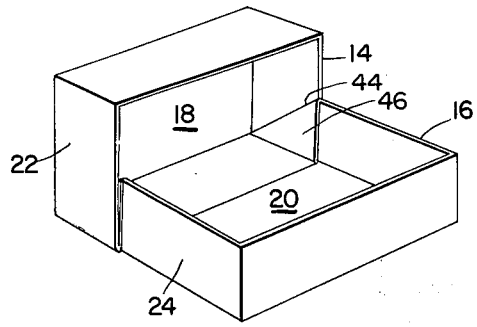
Figure 4:
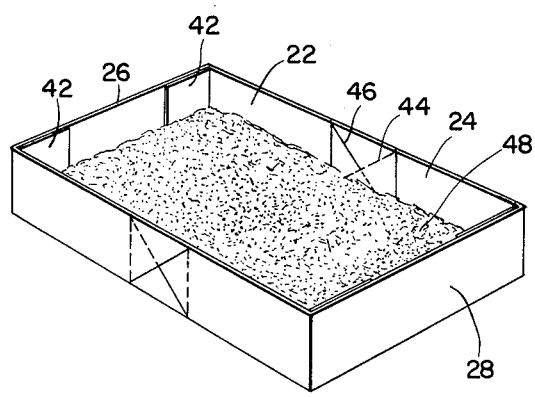
Figure 5:
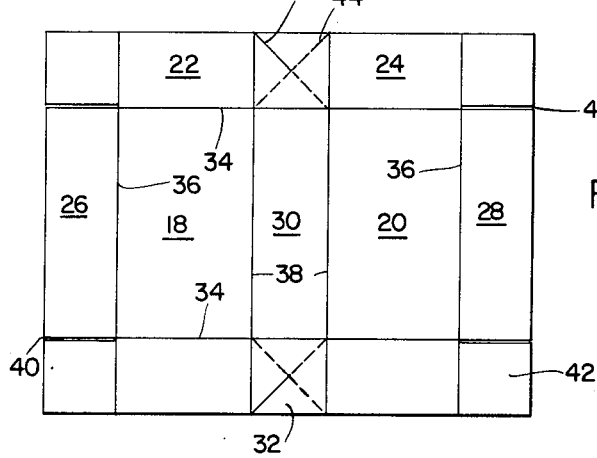
Figure 6:
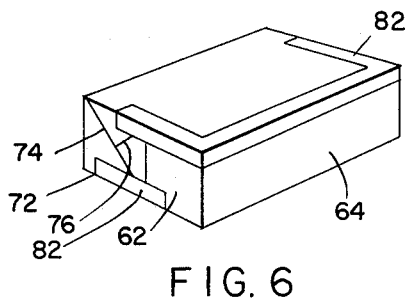
Figure 7:
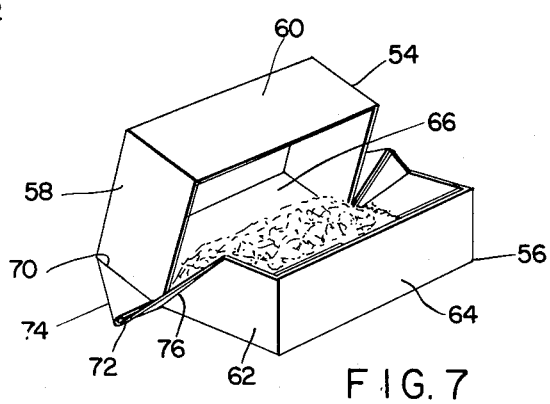
Figure 8:
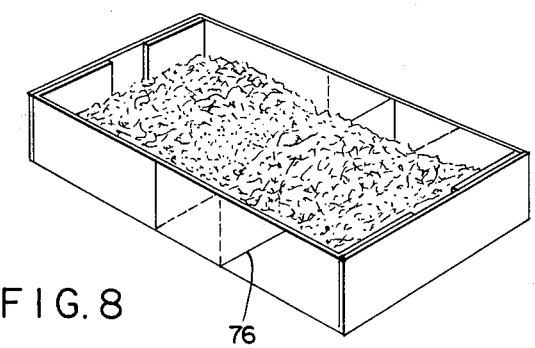
Figure 9:
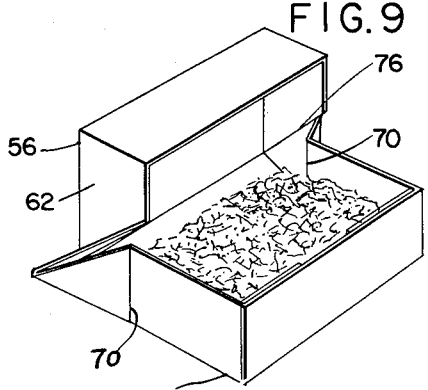
Figure 10:
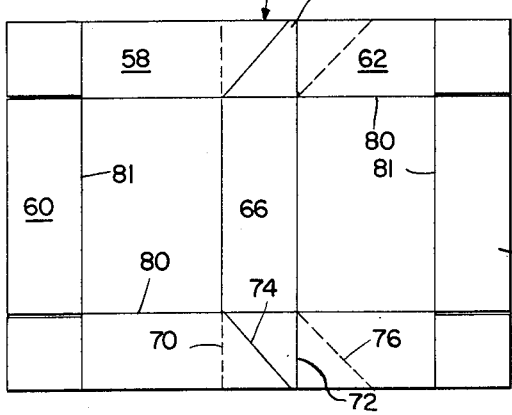

FIGS. 2 and 3 are views similar to FIG. 1 but showing the station in different stages of opening, FIG. 4 shows the station in a fully open position, FIG. 5 is a top plan view of the box blank, FIG. 6 is a view in perspective of a modification of the invention, FIG. 7 is a view similar to FIG. 6 but showing the station partly open, FIG. 8 is a perspective view showing the station fully open, FIG. 9 is a perspective view showing the station partly closed, being rotated 180° relative to FIGS. 6–8, and, FIG. 10 is a top plan view of the box blank for the FIGS. 6–9 modification.

Referring now to FIGS. 1 through 5 of the drawings the reference character 10 generally indicates a self-packaging, completely disposable, foldable toilet station for pet animals such as cats, puppies and the like. The station includes a box 12 preferably fabricated from a relatively stiff paperboard material that has been impregnated with a wax coating or other substance suitable for moisture-proofing the paperboard.

The box 12 comprises a lid or cover portion 14 and a bottom portion 16, each portion having a rectangular center panel 18 and 20 respectively, with each center panel having a pair of depending side panels 22 and 24 and an end panel 26 and 28 respectively. A hinge panel 30 connects the two center panels 18 and 20 and a pair of pleat sections 32 connecting the side panels 22 and 24. In practice, the panel 18 should have slightly more depth than the panel 20 and the hinge panel 30 should likewise be a little deeper than the end panels 26 and 28 to accommodate for material thickness when closing the box.

As best shown in FIG. 5 the box 12 is formed from a single rectangular blank, cut, scored and folded as illustrated. The blank is scored along a pair of parallel longitudinal fold lines 34 which extend along opposite side margins of the blank between a pair of parallel fold lines 36 which are also scored and which are located along opposite end margins of the blank. These fold lines define the side panels 22 and 24 as well as the end panels 26 and 28 while a pair of spaced parallel fold lines 38 are scored transversely across the mid-portion of the blank to define the hinge panel 30.

At either end of the blank, cuts 40 are made in line with the fold lines 34 and cross the end panels 26 and 28 to form hinged corner tabs or ears 42 which are glued to the inside face of the end panels when the box is fully set up. The pleat sections 32, which are located on either end of the hinge panel 30, are formed with a pair of intersecting diagonal score lines 44 and 46 with the entire score line 44 and the right hand half of score line 46 (both indicated by broken lines) being made on the rear or outer surface of the blank while the left hand half of the score line 46 (indicated by a solid line) is made on the front or inner surface. When the box 12 is in the open tray position of FIG. 4, the pleat sections 32 are flat and upright to define a continuous straight side wall with the panels 22 and 24. However, when the box is being folded closed, the pleat section will first be folded along the line 44 in the manner shown in FIG. 3 with side panels 22 overlaying the side panels 24. As the cover 14 is closed further over the bottom portion 16, the pleat section folds inwardly along the fold line 46, the opposite halves of which are now folded against each other. The resulting closed box is neat and snug with no exposed hinges and provides a firm, compact and sealed container.

To complete the station 10 a quantity of particulate absorbent material 48 is supplied with the box 12, either separately wrapped in an inner package 50 as suggested in FIG. 2, or it may be loosely packed in the box 12, as desired. If the absorbent material is separately wrapped within the box then the box may be sealed by a short strip 52 of tape. On the other hand, if the material is packed loosely, the box should be sealed by a continuous strip of tape along the open edges to prevent any of the material from seeping out. In practice, ground clay has proven to be particularly effective because of its highly absorbent, odorless and granular characteristics. Other materials such as sand, sawdust or diatomaceous earth may also be used to advantage. For best results, however, attapulgite is preferred. This type of clay may be defined as a hydrated magnesium aluminum silicate and is known more commonly as fuller's earth.

It will be readily understood that the station 10 normally will be supplied in the closed and sealed condition shown in FIG. 1. The station may be stored in this condition until ready for use. When the station is to be set up for use, it is necessary only to break the seal 52, swing the lid 14 back to form the open tray of FIG. 4 and then spread the absorbent material 48 more or less evenly over the tray bottom. After a certain period of use, the absorbent material will no longer be effective and the entire station is simply folded closed and the whole thing neatly discarded. In order to facilitate closing the lid, it is recommended that the tray be tilted slightly and all of the absorbent material be shaken down towards one end of the tray.

In FIGS. 6 through 10 there is illustrated a modification of the invention and in this embodiment the side pleats at the hinges fold outwardly instead of inwardly so as not to be jammed into the absorbent material when the station is being folded closed. The modified station of FIGS. 6 through 10 is similar to the FIGS. 1 through 5 embodiment and is provided with articulated lid and bottom portions 54 and 56, each having depending side and end panels 58, 60, 62 and 64 defined by fold lines 80 and 81 and connected to a common hinge panel 66. At either end of the hinge panel and between the side panels 58 and 62 are a pair of pleat sections 68 defined by a pair of parallel transverse fold lines 70 and 72 and a pair of parallel diagonal fold lines 74 and 76 best shown in FIG. 10 and all of which extend between the longitudinal edges of the blank and the longitudinal fold lines 80 which define the side panels 58 and 62. The transverse fold line 70 and the diagonal fold line 76 are scored on the rear or outer surface of the blank as viewed in FIG. 10 while the fold lines 72 and 74 are scored on the inner or front surface of the blank. For best results the diagonal fold line 74 and the transverse fold line 72 should not meet the outer edge of the blank but rather the outer ends of these fold lines should be slightly spaced to define a narrow transverse margin indicated by reference character 78. This margin will provide sufficient clearance for the lower triangle pleat sections to be folded easily over the upper two triangular pleat sections which will be folded in face to face relation along the fold lines 74 as the box is closed.

Referring now more particularly to FIG. 6, it will be seen that the pleat sections fold along the outside of the box and may be held flush against the side panels 62 by strips of tape 82 applied along the corner edges. As before, the box is opened by slitting the tape and swinging the lid 54 back to form the open tray of FIG. 8. Absorbent material 84 is distributed and the station is ready for use. When the station is to be discarded, the absorbent material is moved into the lid portion 54 rather than the bottom portion 56 so that when the box is closed the side and end panels will be on the outside for easier closing. This is best shown by reference to FIG. 9 where the station has been rotated 180° from its original position.

It will be appreciated that the pet toilet station illustrated and described herein is a particularly neat and useful item in that it eliminates entirely all handling of the absorbent material which is included with the box. The station is self-packaging and can be provided at a very low cost. Since both the absorbent material and tray are used and discarded as a unit, there is no need for maintaining a supply of absorbent material or for employing a separate tray of any sort. The station will be found to be particularly useful when traveling or vacationing with pets.

While the invention has been described with particular reference to the illustrated embodiments, it will be understood that numerous modifications thereto will appear to those skilled in the art. It will also be understood that the above description and drawings should be taken as illustrative of the invention rather than in a limiting sense.

Having thus described my invention, what I claim and desire to obtain by Letters Patent of the United States is:

A combined disposable, foldable, package and sanitary station for pet animals, including a box formed from stiff paperboard moistureproof sheet material, said box having articulated lid and bottom portions, each of said portions formed with flat body panels, side panels of constant width disposed about the marginal edges of said body panels and arranged generally normal to the planes thereof, said box defining a closed container with the side panels of the lid portion overlapping the side panel of the bottom portion when said lid and bottom portions are folded against one another and defining a flat open tray with continuous surrounding upright side walls when said lid and bottom portions are folded open into substantially coplanar positions and a quantity of dry granular absorbent material packaged within said box to be spread over said tray when said box is in its open position, scored pleat sections formed in the mid-portions of an opposing pair of said side panels, said pleat sections each having a rectangular outline with intersecting diagonal score lines defining four triangular sections adapted to be folded over one another when said box is closed for ready disposal of the used absorbent material and animal waste.

References Cited in the file of this patent
UNITED STATES PATENTS 2,741,223 Winborn _____ Apr. 10, 1956
2,914,234 Hazelwood _____ Nov. 24, 1959